(12) United States Patent
Allen

(10) Patent No.: US 7,911,306 B2
(45) Date of Patent: Mar. 22, 2011

(54) TRANSFORMER BOARD

(75) Inventor: Charles Robert Allen, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 490 days.

(21) Appl. No.: 11/971,010

(22) Filed: Jan. 8, 2008

(65) Prior Publication Data

US 2009/0174514 A1 Jul. 9, 2009

(51) Int. Cl.
*H01F 27/02* (2006.01)
*G01F 1/66* (2006.01)

(52) U.S. Cl. ........... 336/90; 336/82; 336/92; 336/96; 73/861.26; 73/861.27; 73/861.28; 73/861.29

(58) Field of Classification Search .......... 336/82, 336/90, 92, 96; 73/861.26–861.29
See application file for complete search history.

(56) References Cited

U.S. PATENT DOCUMENTS

| | | | | |
|---|---|---|---|---|
| 2,959,054 | A * | 11/1960 | Welkowitz | 73/861.02 |
| 4,202,210 | A * | 5/1980 | Multon et al. | 73/861.26 |
| 4,661,792 | A * | 4/1987 | Watkins | 336/65 |
| 5,394,047 | A * | 2/1995 | Scharlack et al. | 310/316.01 |
| 6,158,288 | A | 12/2000 | Smith | |
| 6,710,691 | B2 * | 3/2004 | Yu et al. | 336/55 |
| 6,895,825 | B1 * | 5/2005 | Barkhoudarian | 73/861.28 |
| 2004/0011141 | A1 | 1/2004 | Lynnworth | |

FOREIGN PATENT DOCUMENTS

| | | | |
|---|---|---|---|
| JP | 08154377 A | * | 6/1996 |
| JP | 2005172658 A | | 6/2005 |
| JP | 200740870 A | | 2/2007 |

OTHER PUBLICATIONS

Abstract and English translatoin of JP 2005-172658 A.*
PCT/US2008/087010 International Search Report, Aug. 3, 2009, pp. 1-12.

* cited by examiner

*Primary Examiner* — Elvin G Enad
*Assistant Examiner* — Tszfung Chan
(74) *Attorney, Agent, or Firm* — Gregory L. Maag, Esq.; Conley Rose, P.C.

(57) ABSTRACT

A transformer board is disclosed. In some embodiments, the transformer board includes a base, a circuit board, a transformer having a first and second winding, a first and a second connector, a ribbon cable and a nonconductive fill material. The base has a recess within which the circuit board is positioned. The transformer is mechanically coupled to the circuit board. The first connector is configured to electrically couple to transducers within a pressure boundary of an ultrasonic flow meter and is electrically coupled to the second winding of the transformer. The ribbon cable is electrically coupled between the first winding of the transformer and the second connector. The nonconductive fill material is contained by the recess and encases the circuit board, the transformer, the coupling of the first connector to the second winding of the transformer, and the coupling of the ribbon cable to the first winding of the transformer.

16 Claims, 7 Drawing Sheets

TRANSFORMER BOARD

CROSS-REFERENCE TO RELATED APPLICATIONS

Not applicable.

BACKGROUND

1. Field of Art

This disclosure relates to ultrasonic flow meters. More particularly, the disclosure relates to a transformer board that enables positioning of transformers, coupled to transducers located within an ultrasonic flow meter, outside of the pressure boundary of the flow meter.

2. Description of Related Art

After hydrocarbons have been removed from the ground, the fluid stream (such as crude or natural gas) is transported from place to place via pipelines. It is desirable to know with accuracy the amount of fluid flowing in the stream, and particular accuracy is demanded when the fluid is changing hands, or "custody transfer." Even where custody transfer is not taking place, however, measurement accuracy is desirable.

Ultrasonic flow meters may be used in situations such as custody transfer. An ultrasonic flow meter includes two or more transducers, each contained within a housing secured inside of a port in the body, or spool piece, of the flow meter. To contain fluid within the flow meter, an end connector is secured over each transducer port. Thus, the spool piece and end connectors create a pressure boundary that contains fluid flowing through the meter. To measure fluid flow through the meter, a pair of transducers is positioned along the inner surface of the spool piece, such that each transducer faces the other. Each transducer includes a piezoelectric element, and when an alternating current is applied to the piezoelectric element of the first transducer, the piezoelectric element responds by radiating an ultrasonic wave in the fluid passing through the flow meter. When the wave is incident upon the piezoelectric of the second transducer, that transducer responds by generating an electric signal. Some time later, an alternating current is applied to the piezoelectric element of the second transducer, and the piezoelectric element responds by radiating an ultrasonic wave through the fluid in the flow meter. When the wave is incident upon the piezoelectric of the first transducer, that transducer responds by generating an electric signal. In this way, the transducers transmit and receive signals back and forth across the fluid stream.

Each transducer is coupled to a cable that extends through the end connector and along the outer surface of the spool piece to a remote location, such as an electronics base enclosure mounted to the spool piece. The cable carries the signal created by the piezoelectric element to an acquisition board positioned within the electronics base enclosure, where the signal may be processed and subsequently used to determine the fluid flow rate through the meter.

When not in use, the piezoelectric elements in the transducers can build up an electrical charge. The electric charge presents a hazard to individuals performing maintenance on the flow meter. To reduce the risk to maintenance personnel, each piezoelectric element is coupled to a transformer, which, in addition to functions discussed below, provides a discharge path for an electrical charge created by the piezoelectric element.

The transformer also provides impedance matching between the piezoelectric element of the transducer and an acquisition device that ultimately receives the signal generated by the piezoelectric element. Thus, the transducer and the transformer are matched. For this reason, the transformer in the related art is positioned within the transducer. When either the transducer or the transformer requires replacement, both components are replaced because they are matched.

Positioning the transformer within the transducer exposes the transformer to the same conditions as those experienced by the transducer. Such exposure is undesirable when the transformer limits the transducer size or is not designed for the same conditions as the transducer. For example, the fluid passing through the meter may be corrosive. While the transducer may be compatible with corrosive conditions, the transformer may not. In such circumstances, the corrosive fluid may damage the transformer and associated electrical wiring.

One way to prevent corrosion damage to the transformer may be to encase the transformer within a material that can withstand a corrosive environment. However, such a process may be prohibitively costly.

SUMMARY

The problems noted above are addressed, at least in part, by a transformer board. In some embodiments, the transformer board includes a base, a first circuit board, a transformer having a first and a second winding, a first and a second connector, a ribbon cable and a nonconductive fill material. The base has a recess within which the first circuit board is positioned. The transformer is mechanically coupled to the first circuit board. The first connector is configured to electrically couple to transducers within a pressure boundary of an ultrasonic flow meter and has a plurality of electrical contacts electrically coupled to the first winding of the transformer. The ribbon cable is electrically coupled at its proximal end to the second winding of the transformer and at its distal end to the second connector. The second connector is configured to couple to a second circuit board. The nonconductive fill material is contained by the recess and encases the first circuit board, the transformer, the coupling of the second connector to the second winding of the transformer, and the coupling of the ribbon cable to the first winding of the transformer.

Some system embodiments include an ultrasonic flow meter having a pressure boundary to contain a fluid therein, a transducer positioned within the pressure boundary, and a transformer positioned outside of the pressure boundary. The transformer is configured to provide impedance matching between the transducer and a signal acquisition system.

Some method embodiments include passing fluid through an ultrasonic flow meter having a pressure boundary to contain the fluid therein, sending an acoustic signal generated by a first transducer through the fluid to be incident upon a second transducer, generating an electric signal by the second transducer responsive to the acoustic signal, and sending an acoustic signal generated by a first transducer through the fluid to be incident upon a second transducer. The first and the second transducers are positioned within the pressure boundary. The transformer provides, at least in part, impedance matching between the transducer and a signal acquisition device.

At least one embodiment is an ultrasonic meter comprising a spool piece defining a fluid flow pathway within a pressure boundary and a first and second transducer operatively coupled to the spool piece and within the pressure boundary. The first and second transducers are in operational relationship to each other. The ultrasonic meter further comprises an electronics enclosure coupled to the spool piece outside of the pressure boundary. A signal acquisition circuit board and a transformer board proximate to the signal acquisition board are positioned within the electronics enclosure.

The transformer board comprises a base with a recess, a circuit board within the recess, and a first and second transformer mechanically coupled to the circuit board. Each transformer comprises a first winding and a second winding. The second winding of the first transformer is electrically coupled to the first transducer, and the second winding of the second transformer is electrically coupled to the second transducer. The first winding of the first transformer is electrically coupled to the signal acquisition board, and the first winding of the second transformer electrically coupled to the signal acquisition board. The first and second transformers provide, at least in part, impedance matching between the transducers and the signal acquisition board. A nonconductive fill material is contained by the recess and encases the circuit board and transformers.

The foregoing has outlined rather broadly features of disclosed embodiments in order that the detailed description that follows may be better understood. Additional features will be described hereinafter that form the subject of certain of the claims.

Notation and Nomenclature

Certain terms are used in the following description and claims to refer to particular system components. As one skilled in the art will appreciate, different persons may refer to a component by different names. This document does not intend to distinguish between components that differ in name but not function. The drawing figures are not necessarily to scale. Certain features of the invention may be shown exaggerated in scale or in somewhat schematic form, and some details of conventional elements may not be shown, all in the interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a detailed description of the various embodiments, reference will now be made to the accompanying drawings in which.

DETAILED DESCRIPTION OF THE DISCLOSED EMBODIMENTS

The following discussion is directed to various embodiments of the invention. One skilled in the art will understand that the following description has broad application, and the discussion of any embodiment is meant only to be exemplary of that embodiment, and not intended to intimate that the scope of the disclosure, including the claims, is limited to that embodiment.

Figure 1:
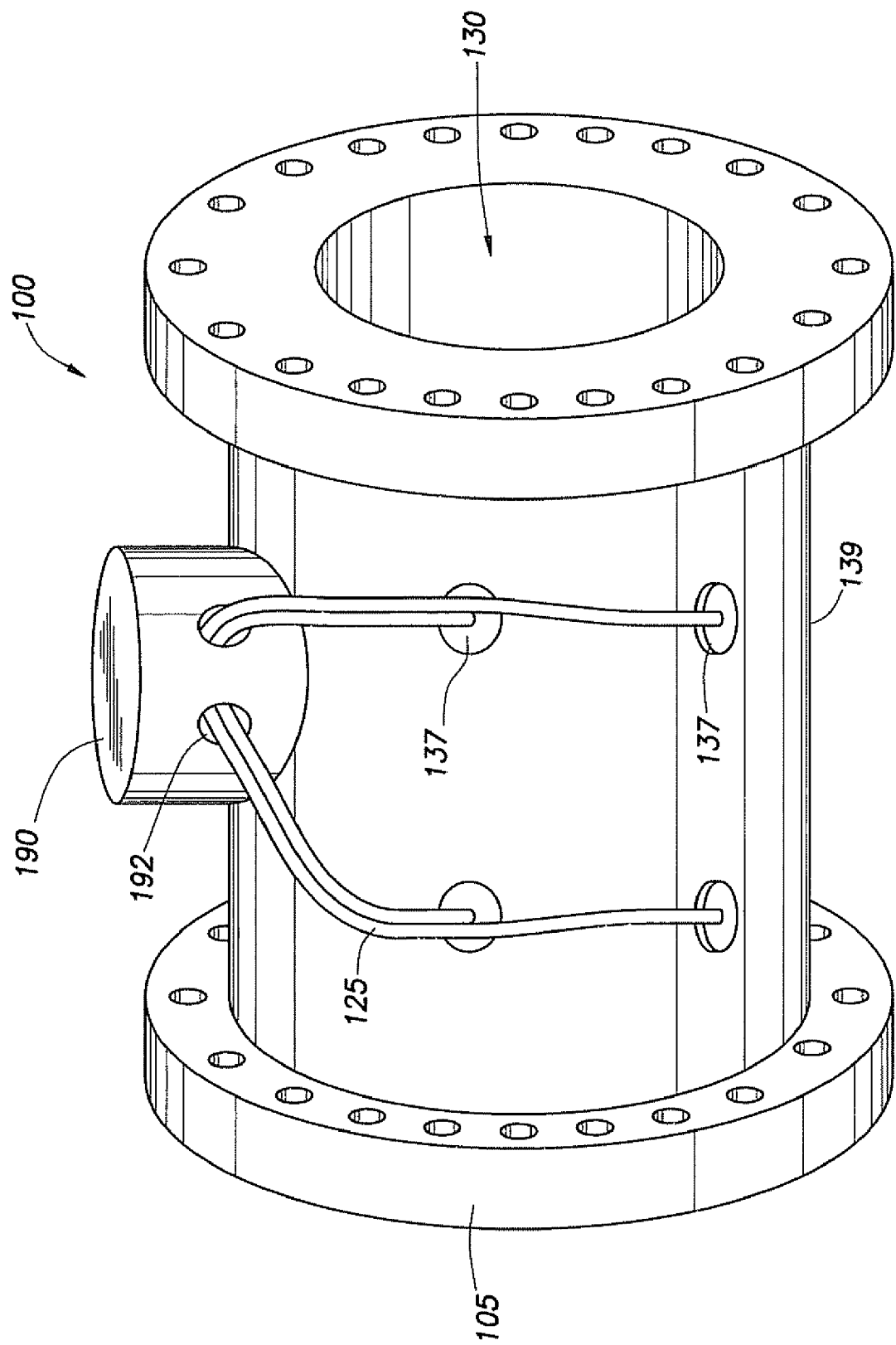
FIG. 1 is perspective view of an ultrasonic flow meter with a transformer board in accordance with principles described herein.

FIG. 1 is a perspective view of an ultrasonic flow meter with a transformer board in accordance with principles disclosed herein. Ultrasonic flow meter 100 includes spool piece 105 having axial flowbore 130 therethrough and electronics base enclosure 190 coupled to an outer surface 139 of spool piece 105. Spool piece 105 is the housing for ultrasonic flow meter 100 and configured for placement between sections of a pipeline. Fluid flows through bore 130, and that fluid may be corrosive in nature and/or have an extreme temperature. Electronics base enclosure is a cylindrically shaped housing. However, electronics enclosure base 190 may equivalently take other physical forms.

Figure 2:
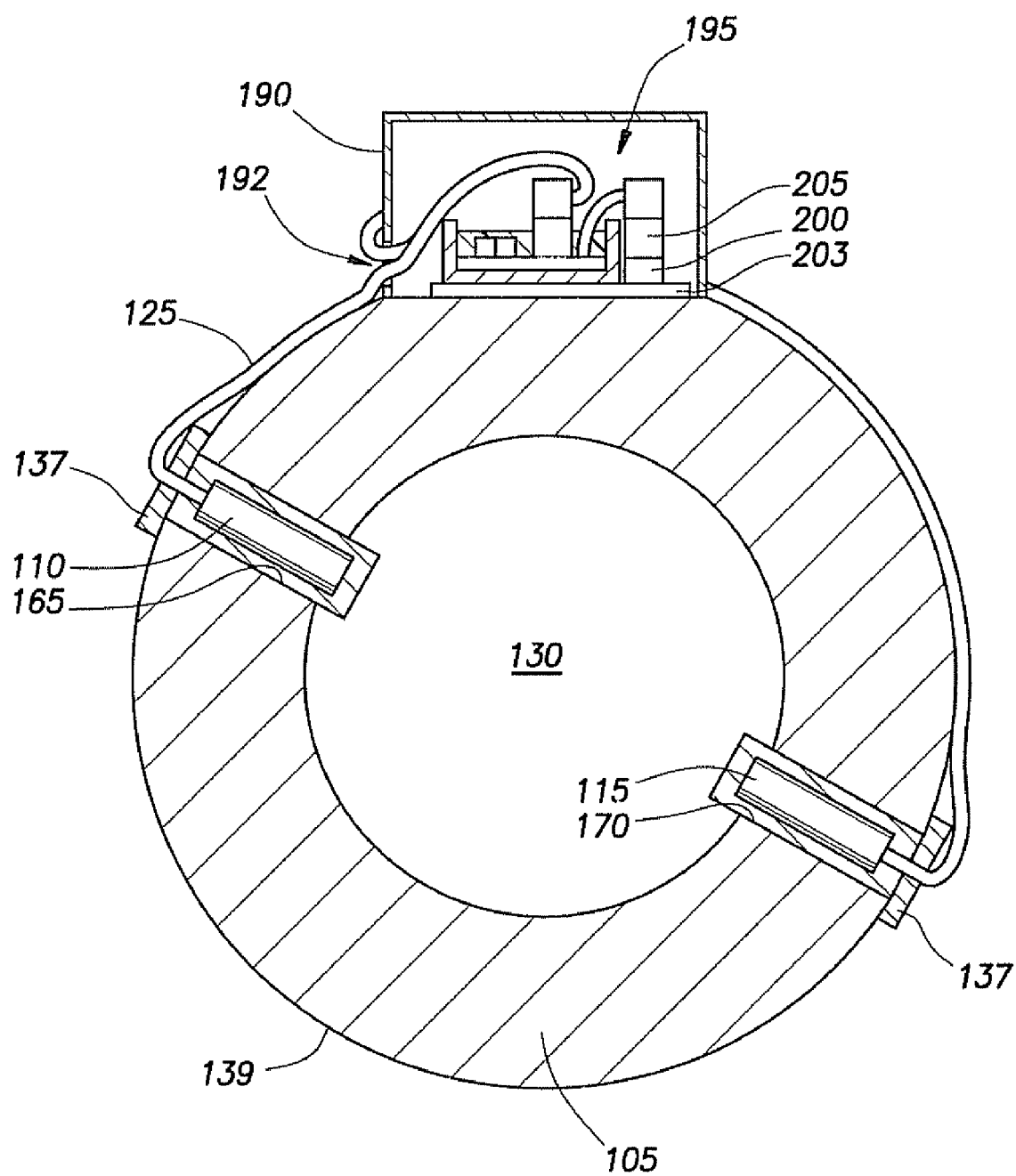
FIG. 2 is a cross-sectional view of the ultrasonic flow meter of FIG. 1, illustrating a position of the transformer board external to the pressure boundary of the flow meter.

FIG. 2 is a cross-sectional view of the ultrasonic flow meter 100 depicted in FIG. 1. As shown, spool piece 105 further includes two transducer ports 165, 170 within which transducers 110, 115, respectively, are positioned. An end connector 137 is coupled to spool piece 105 over each transducer port 165, 170. End connectors 137 and spool piece 105 form a pressure boundary that contains pressurized fluid within ultrasonic flow meter 100. In some embodiments, each end connector 137 and transducer 110, 115 are integral components.

One or more individual conductors are coupled to each transducer 110, 115 and carry signals between transducers 110, 115 and a remote location. These individual conductors are collectively referred to as cables 125. In this exemplary embodiment, the remote location is electronics base enclosure 190. Cables 125 extend from transducers 110, 115 into electronics enclosure base 190 through openings 192.

Transformer board 195 and signal acquisition board 200 are disposed within and secured to electronics enclosure base 190 by bracket 203. Transformer board 195 is electrically coupled to signal acquisition board 200 by pin contact connector 205. Cables 125 are coupled to transformer board 195. Signals carried by cables 125 from transducers 110, 115 are transmitted through transformer board 195 and pin contact connector 205 to signal acquisition board 200 where the signals may be processed. In at least some embodiments, signal acquisition board 200 is an analog to digital conversion device.

Figure 3:
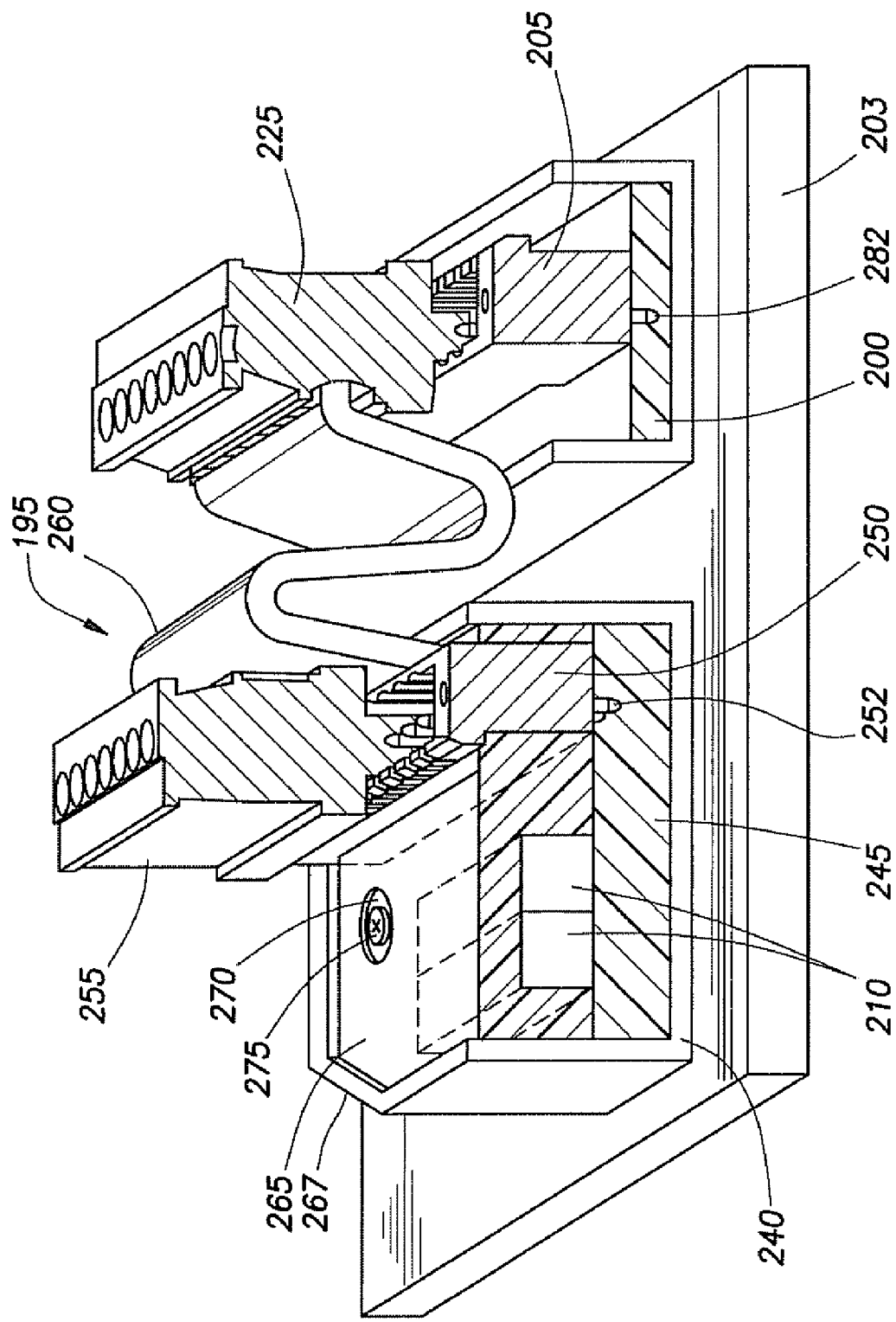
FIG. 3 is an enlarged cross-sectional view of the electronics base enclosure with the transformer board positioned therein.

FIG. 3 is a cross-sectional view of electronics base enclosure 190 and signal acquisition board 200. Transformer board 195 includes one or more transformers 210. Positioning transformers 210 outside of the pressure boundary of ultrasonic flow meter 100 prevents exposure of transformers 210 to fluid contained within ultrasonic flow meter 100, which may be corrosive and/or subject to extreme temperatures. Moreover, positioning transformers 210 within electronics enclosure base 190 prevents exposure of transformers 210 to surrounding environmental conditions that may damage transformers 210 (e.g., the weather). Wile transformer board 195, and thus transformers 210, is positioned within electronics enclosure base 190 in the exemplary embodiment depicted in FIGS. 1-3, the transformer board 195 may be equivalently positioned anywhere outside of the pressure boundary while still coupled to transducers 110, 115 within flow meter 100.

Still referring to FIG. 3, transformer board 195 bugler includes base 240 circuit board 245, pin contact connector 250, inline socket connectors 255, 225 and ribbon cable 260. Circuit board 245 with transformers 210 mechanically coupled thereto is positioned within a recess in base 240. Pin contact connector 250 is coupled to circuit board 245 by pins 252, which extend from the base of connector 250 and are inserted into slots on circuit board 245. Each transformer 210 includes a primary and a secondary winding. Pin contact connector 250 is coupled to the secondary winding of transformers 210 by pins 252. Ribbon cable 260 is coupled between the primary winding of transformers 210 and inline socket connector 225. Cables 125 (not shown) may be coupled to inline socket connector 255 of transformer board 195, as will be described. Base 240 is mechanically coupled to bracket 203 by two screws 275 (only one is visible in FIG. 3) threaded into holes 270 (only one is visible in FIG. 3) positioned at opposite ends of base 240.

Base 240 is a shell-like housing that further includes nonconductive fill material 265 and two mitered corners 267, only one of which is visible in FIG. 3. Nonconductive fill material 265 forms a layer within base 245 that surrounds, covers and protects transformers 210, circuit board 245, the coupling of connector 250 to the secondary windings of transformers 210 and the coupling of ribbon cable 260 to the primary windings of transformers 210. In some embodiments, nonconductive fill material 265 comprises epoxy, but other substances may be equivalently used. Mitered corners 267 enable positioning of transformer board 195 proximate to signal acquisition board 200 within the cylindrically shaped electronics enclosure base 190. Although depicted as rectangular shaped with mitered coiners in the exemplary embodiment, base 240 may equivalently take other physical forms. Also, in at least some embodiments, base 240 comprises plastic.

Pin contact connector 205 on the signal acquisition board 200 enables coupling of transformer board 195 to signal acquisition board. Pin contact connector 205 is coupled to signal acquisition board 200 by pins 282, which extend from the base of connector 205 and are inserted into slots on signal acquisition board 200. In this exemplary embodiment, pin contact connector 205 is not a component of transformer board 195. However, in other embodiments, pin contact connector 205 may be.

Figure 4:
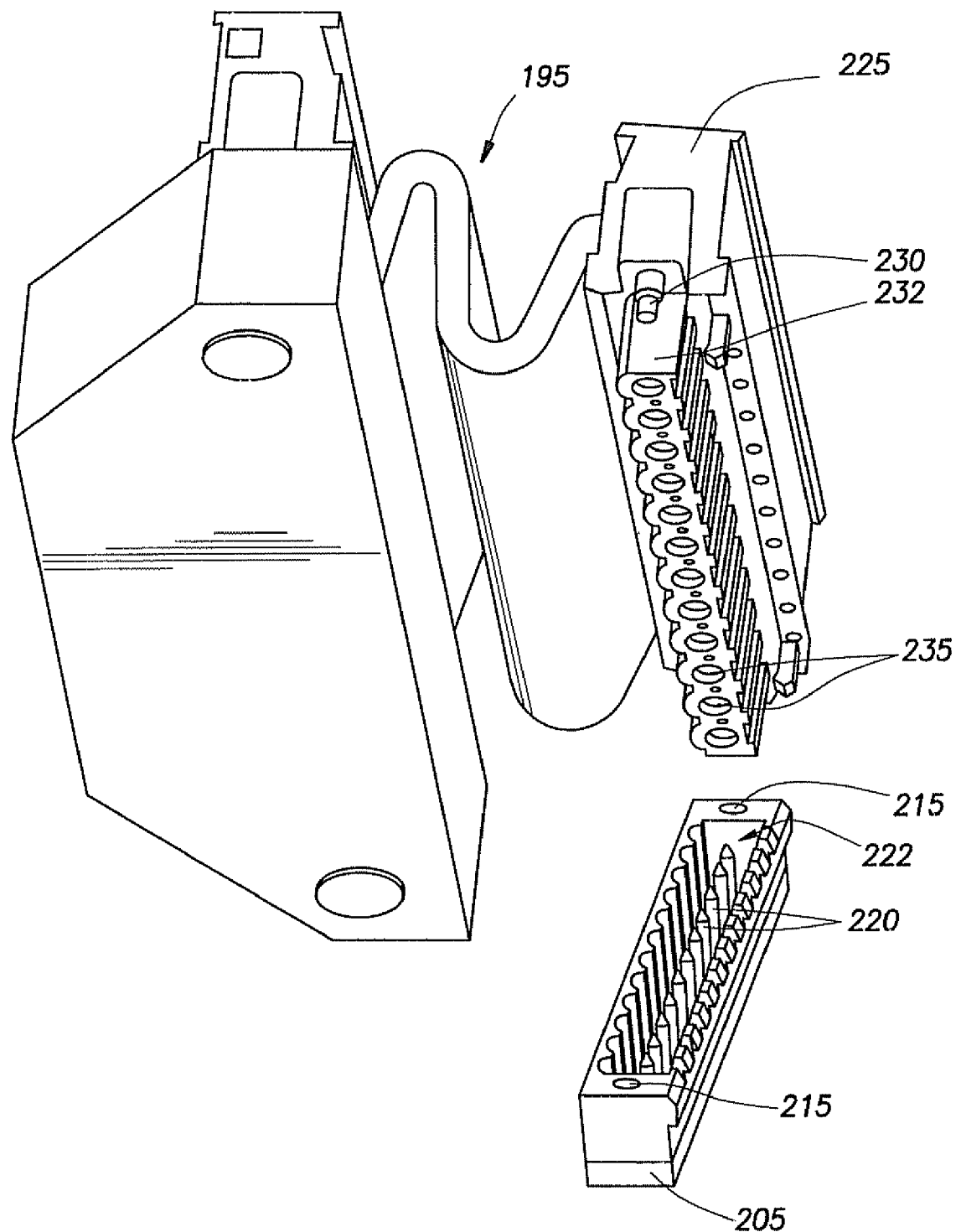
FIG. 4 illustrates the coupling of the transformer board to the signal acquisition board.

FIG. 4 illustrates the coupling of inline socket connector 225 of transformer board 195 to pin contact connector 205, and thus signal acquisition board 200. Pin contact connector 205 includes two treaded holes 215 and a plurality of pins 220 within a recess 222 along the top of connector 205. Inline socket connector 225 includes two screws 230 and an extension 232 containing a plurality of sockets 235 along the base of connector 225. To mechanically couple transformer board 195 to pin contact connector 205 as shown in FIG. 3, extension 232 of connector 225 is inserted into recess 222 of connector 205 with sockets 235 of connector 225 engaging pins 220 of connector 205. To secure the coupling of connectors 205, 225, screws 230 of inline socket collector 225 are threaded into holes 215 of pin contact connector 205. Once mechanically coupled in this manner, connector 225 is also electrically coupled to connector 205, and therefore signal acquisition board 200, by the electrical connections of pins 220 with sockets 235.

Figure 5:
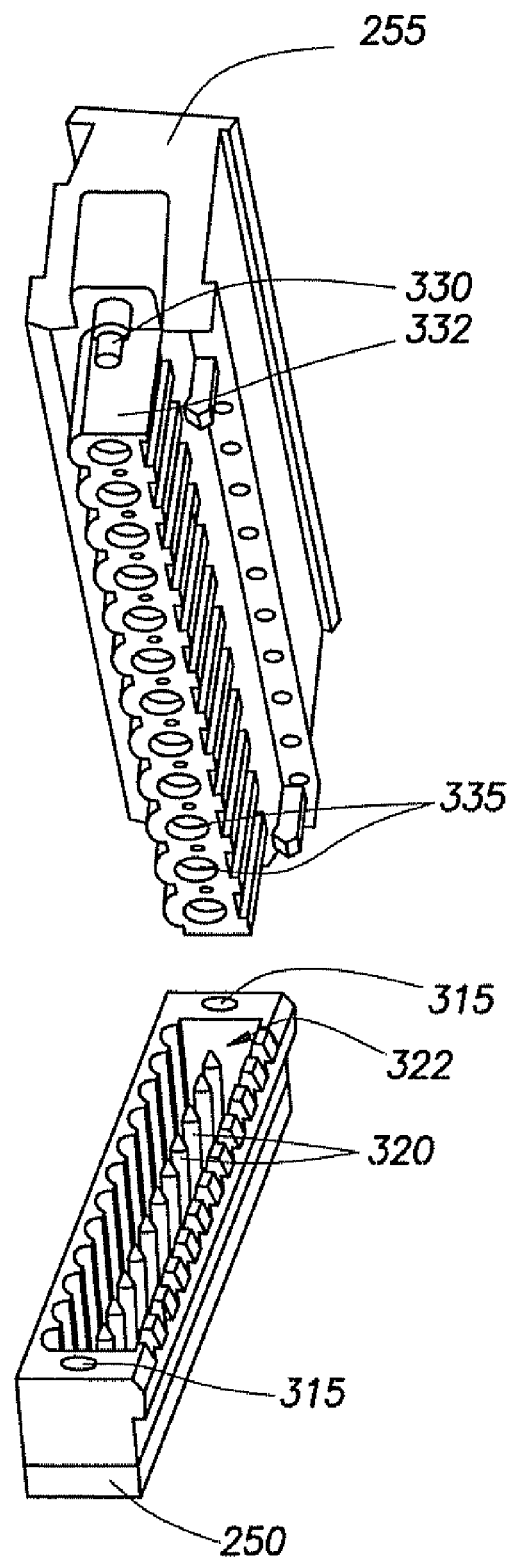
FIG. 5 illustrates the coupling of an inline socket connector with a pin contact connector of the transformer board.

FIG. 5 illustrates the coupling of pin contact connector 250 to inline socket connector 255. In some embodiments, including those depicted by FIG. 5, this coupling is the same or similar to the coupling of inline socket connector 225 to pin contact connector 205 described above. Pin contact connector 250 includes two threaded holes 315 and a plurality of pins 320 within a recess 322 along the top of connector 250. Inline socket connector 255 includes two screws 330 and an extension 332 containing a plurality of sockets 335 alone, the base of connector 255. To mechanically couple inline socket connector 255 to pin contact connector 250 as shown in FIG. 3, extension 332 of connector 255 is inserted into recess 322 of connector 250 with sockets 335 of connector 255 engaging pins 320 of connector 250. To secure the coupling of connectors 250, 255, screws 330 of inline socket connector 255 are threaded into holes 315 of pin contact connector 250. Once mechanically coupled in this manner, connector 255 is also electrically coupled to connector 250 by the electrical connections of pins 320 with sockets 335.

Figure 6:
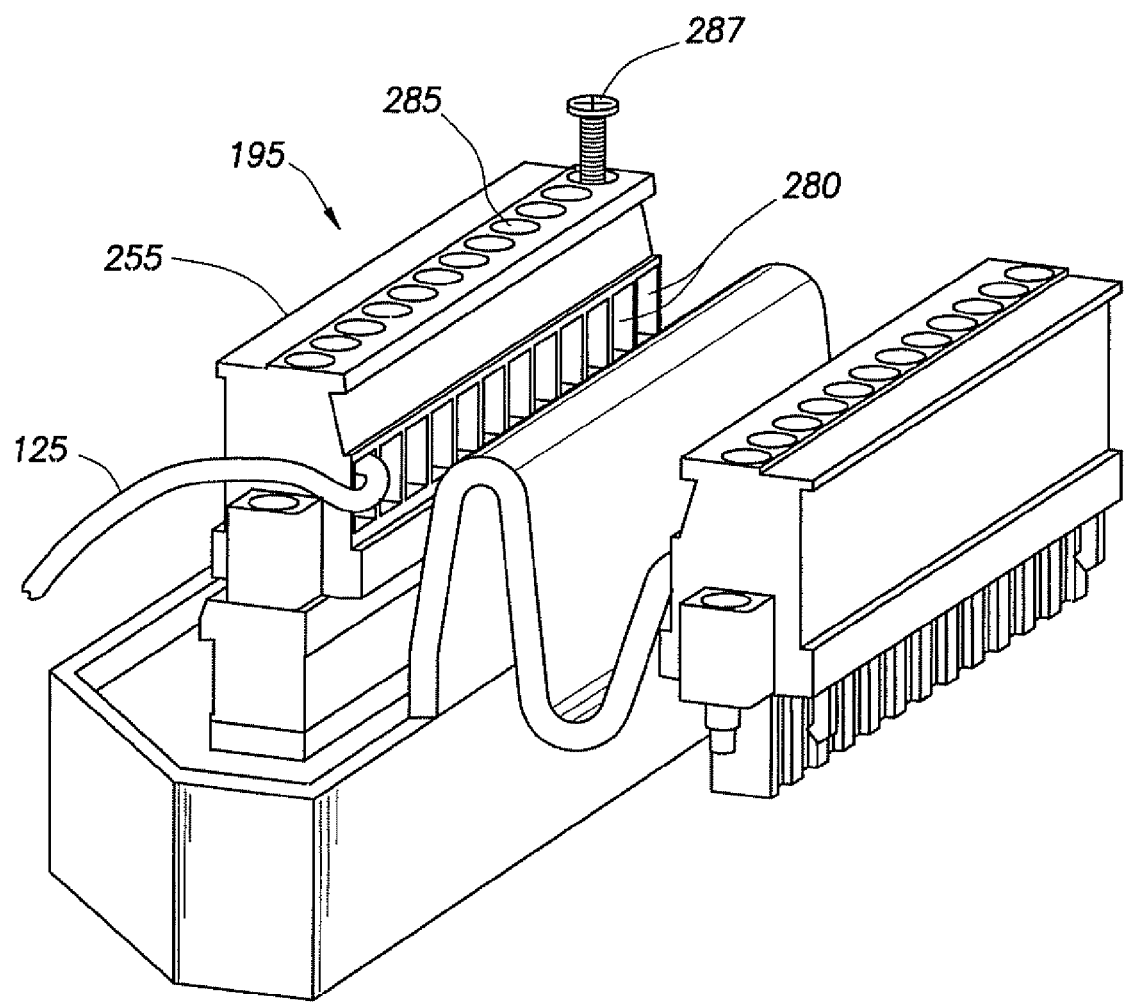
FIG. 6 illustrates the coupling of the transformer board to the transducers.

FIG. 6 illustrates the coupling of transformer board 195 to cables 125, and thus transducers 110, 115. Inline socket connector 255 includes a plurality of openings 280, holes 285 and screws 287. As described above, cables 125 include a number of individual conductors that are either coupled to transducer 110 or transducer 115. To couple cables 125 to transformer board 195, the individual conductors, which collectively make up cables 125, are each inserted into an opening 280 in inline socket connector 255. Screws 287, one each within each hole 285, secure the conductors within inline socket connector 255.

Figure 7:
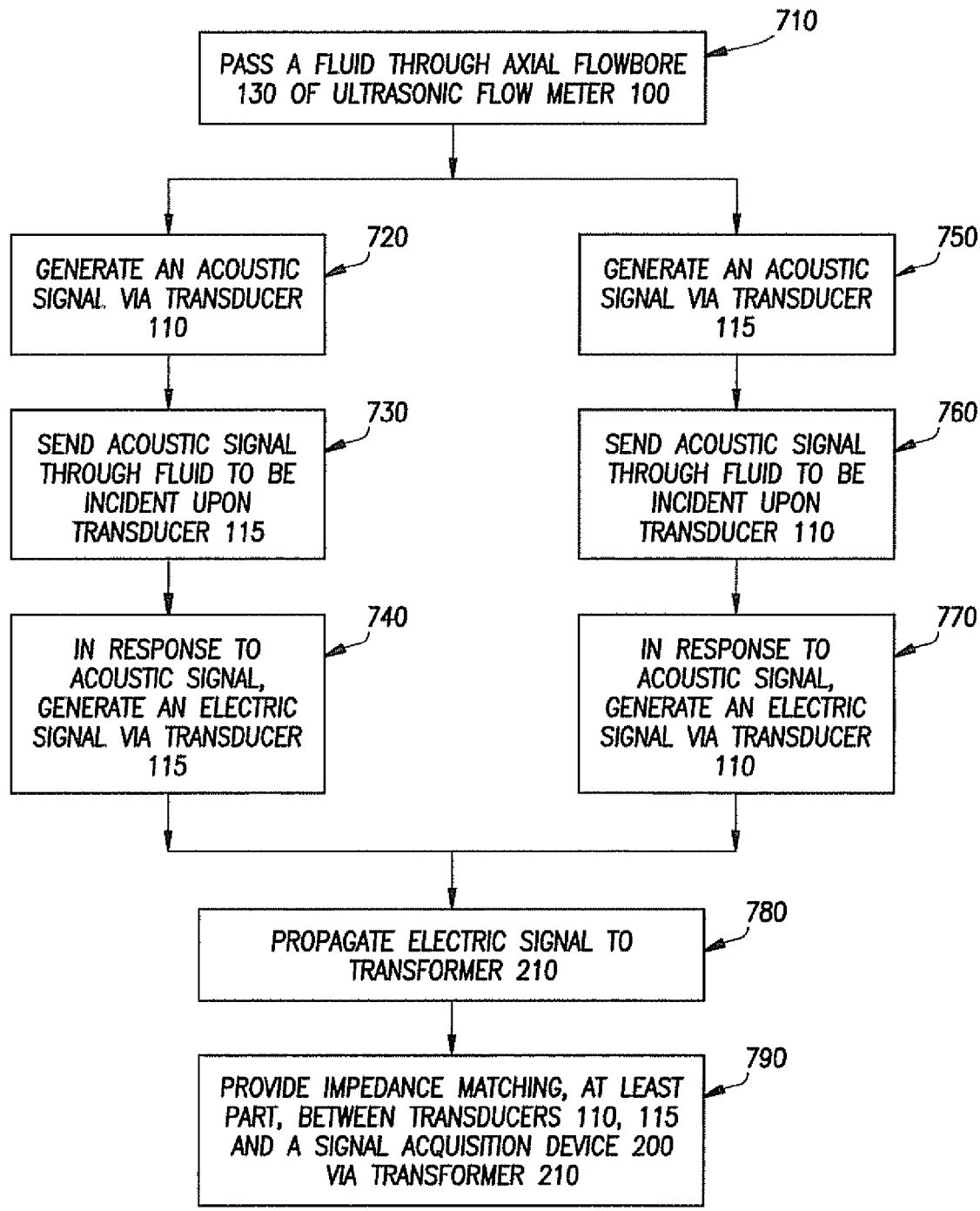
FIG. 7 illustrates various representative method embodiments for propagating, an electric signal from the transducers to the transformers.

FIG. 7 illustrates various method embodiments propagating an electric signal from the transducers 110, 115 to the transformers 210 of transformer board 195. These method embodiments begin when a fluid is passed through the axial flowbore 130 of ultrasonic flow meter 100 (block 710). An acoustic signal is generated by transducer 110 (block 720). The acoustic signal then travels through the fluid to be incident upon transducer 115 (block 730). Both transducers 110, 115 are positioned within the pressure boundary of ultrasonic flow meter 100, for instance, within transducer ports 165, 170. In response to the acoustic signal, transducer 115 responds by generating an electric signal (block 740).

Alternatively, the acoustic signal may be generated by transducer 115 (lock 750). The acoustic signal then travels through the fluid to be incident upon transducer 110 (block 760). In response to the acoustic signal, transducer 110 responds by generating an electric signal (block 770).

Whether generated by transducer 110 or transducer 115, the electric signal then propagates to a transformer 210 positioned outside of the pressure boundary of ultrasonic flow meter 100 (block 780). The transformer 210 provides, at least in part, impedance matching between transducers 110, 115 and a signal acquisition device 200 (block 790).

Because transformers 210 are positioned outside of the pressure boundary of the ultrasonic flow meter 100, transformers 210 are not exposed to fluid contained within meter 100, which may be corrosive and/or subject to an extreme temperature. Additionally, containment of transformers 210 within electronics enclosure base 190 prevents exposure of transformers 210 to potentially damaging environmental conditions surrounding the flow meter 100.

While preferred embodiments have been shown and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied. The number of transformers 210 contained within transformer board 195 may vary.

Transformer board 195 may be positioned in locations outside of the pressure boundary of ultrasonic flow meter 100 other than an electronics enclosure base 190 mounted on the meter spool piece 105. Accordingly, it is intended that the following claims be interpreted to embrace all such variations and modifications.

What is claimed is:

1. An ultrasonic meter comprising:
 a spool piece defining a fluid flow pathway within a pressure boundary;
 a first and second transducers operatively coupled to the spool piece and within the pressure boundary, the first and second transducers in operational relationship to each other;
 an electronics enclosure coupled to the spool piece, the electronics enclosure outside of the pressure boundary;
 a signal acquisition circuit board positioned within the electronics enclosure;
 a transformer board positioned within the electronics enclosure proximate to the signal acquisition circuit board, the transformer board comprising:
  a base comprising a recess;
  a circuit board within the recess;
  a first and second transformers mechanically coupled to the circuit board, each transformer comprising a first winding and a second winding;
  said second winding of the first transformer electrically coupled to the first transducer, and the second winding of the second transformer electrically coupled to the second transducer;
  said first winding of the first transformer electrically coupled to the signal acquisition board, and the first winding of the second transformer electrically coupled to the signal acquisition board;
  said first and second transformers provide, at least in part, impedance matching between the transducers and the signal acquisition board; and
  a nonconductive fill material contained by the recess and encasing the circuit board and transformers.

2. The ultrasonic meter of claim 1, wherein the base is at least one selected from the group consisting of: rectangular; rectangular with at least one mitered corner; and trapezoidal.

3. The ultrasonic meter of claim 1, wherein the nonconductive fill material comprises epoxy.

4. The ultrasonic meter of claim 1, wherein the transformer board is mechanically coupled to the electronics enclosure.

5. The ultrasonic meter of claim 1, further comprising a first connector electrically coupled between at least one of the first and second transducers and the second windings of the first and second transformers.

6. The ultrasonic meter of claim 5, further comprising a second connector electrically coupled between at least one of the first and second transducers and the second windings of the first and second transformers and to the first connector.

7. The ultrasonic meter of claim 1, further comprising a ribbon cable electrically coupled between the first windings of the first and second transformers and the signal acquisition board.

8. The ultrasonic meter of claim 7, further comprising a connector electrically coupled between the ribbon cable and the signal acquisition board.

9. An ultrasonic meter comprising:
 a spool piece defining a fluid flow pathway within a pressure boundary;
 a first transducer and a second transducer operatively coupled to the spool piece and within the pressure boundary;
 a signal acquisition circuit board outside of the pressure boundary;
 a transformer board outside of the pressure boundary, the transformer board comprising:
  a circuit board;
  a first transformer and a second transformer mechanically coupled to the circuit board, each transformer comprising a first winding and a second winding;
  said second winding of the first transformer electrically coupled to the first transducer, and the second winding of the second transformer electrically coupled to the second transducer;
  said first winding of the first transformer electrically coupled to the signal acquisition board, and the first winding of the second transformer electrically coupled to the signal acquisition board;
  said first and second transformers providing, at least in part, impedance matching between the transducers and the signal acquisition board.

10. The ultrasonic flow meter of claim 9, further comprising an electronics enclosure coupled to the spool piece, the electronics enclosure outside of the pressure boundary.

11. The ultrasonic flow meter of claim 10, wherein the transformer board and the signal acquisition circuit board are disposed within the electronics enclosure.

12. The ultrasonic meter of claim 9, further comprising a first connector electrically coupled between at least one of the first and second transducers and the second winding of at least one of the first and second transformers.

13. The ultrasonic meter of claim 12, further comprising a second connector electrically coupled between at least one of the first and second transducers and the second winding of at least one of the first and second transformers and electrically coupled to the first connector.

14. The ultrasonic meter of claim 9, further comprising a ribbon cable electrically coupled between the first windings of the first and second transformers and the signal acquisition board.

15. The ultrasonic meter of claim 14, further comprising a connector electrically coupled between the ribbon cable and the signal acquisition board.

16. The ultrasonic meter of claim 9, further comprising a base having a recess wherein the circuit board is disposed in the recess, and a nonconductive fill material, wherein the nonconductive fill material is contained by the recess and encases the circuit board and transformers.

* * * * *